United States Patent [19]

Gilliam

[11] Patent Number: 4,930,951
[45] Date of Patent: Jun. 5, 1990

[54] TORQUE VERIFICATION APPARATUS AND METHOD

[75] Inventor: Mark A. Gilliam, Lutz, Fla.

[73] Assignee: Tabs, Inc., Edmond, Okla.

[21] Appl. No.: 234,853

[22] Filed: Aug. 22, 1988

[51] Int. Cl.⁵ ............................................. F16B 31/02
[52] U.S. Cl. ....................................... 411/14; 411/11; 116/212; 73/761; 29/407; 29/802
[58] Field of Search .................. 411/8, 9, 10, 14, 1, 411/2, 3, 11, 12, 535, 542, 544, 369, 915; 73/761; 29/407, 426.6, 802; 116/212, DIG. 34

[56] References Cited

U.S. PATENT DOCUMENTS

| | | | |
|---|---|---|---|
| 1,457,749 | 6/1923 | Rast | 411/10 |
| 2,570,863 | 10/1951 | Rowe | 411/9 |
| 2,747,454 | 5/1956 | Bowersett | 411/8 |
| 2,830,486 | 4/1958 | Dillon | 411/9 |
| 3,060,731 | 10/1962 | Adise | 116/DIG. 34 X |
| 3,104,645 | 9/1963 | Harrison | 411/8 X |
| 3,150,557 | 9/1964 | Brown | 411/9 |
| 3,174,385 | 3/1965 | Hallowell, Jr. | 411/2 |
| 3,323,403 | 6/1967 | Waisman | 411/10 |
| 3,469,492 | 9/1969 | Dahl | 411/11 |
| 3,783,734 | 1/1974 | Velthoven | 411/8 |
| 3,788,186 | 1/1974 | Crites | 411/8 |
| 4,131,050 | 12/1978 | Holmes | 411/10 |
| 4,295,761 | 10/1981 | Hansen | 411/8 X |
| 4,431,353 | 2/1984 | Capuano | 411/11 |
| 4,556,350 | 12/1985 | Bernhardt et al. | 411/10 |

FOREIGN PATENT DOCUMENTS 47-20289  6/1972  Japan ........................ 411/8

Primary Examiner—Gary L. Smith
Assistant Examiner—Jerry Redman
Attorney, Agent, or Firm—Laney, Dougherty, Hessin & Beavers

[57] ABSTRACT

Torque verification apparatus and methods for verifying that an amount of torque applied to the nut of a fastener of the type comprising a threaded nut and a bolt having a threaded body portion and a head portion is equal to or greater than a predetermined torque value are provided. The apparatus and methods are particularly useful for verifying that the amount of torque applied to the lug nuts used to mount a wheel to a wheel hub of a vehicle is equal to or greater than a predetermined torque value.

19 Claims, 2 Drawing Sheets

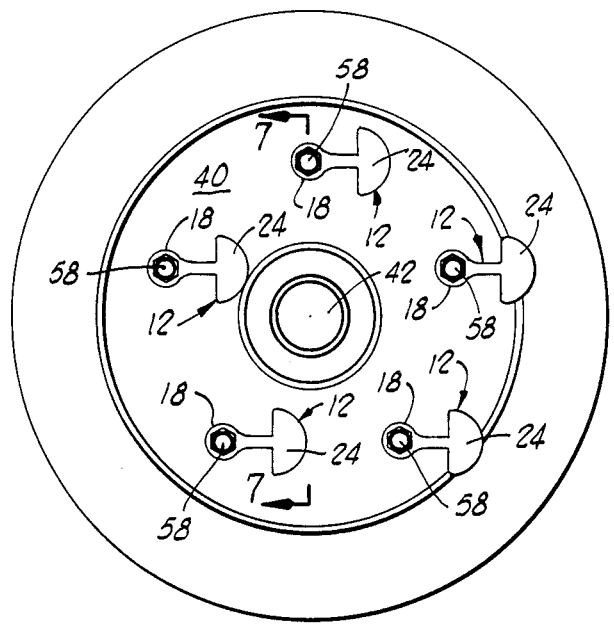
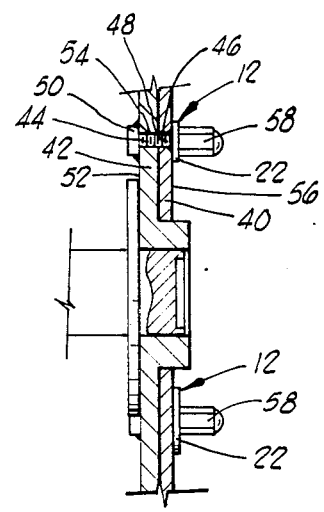
FIG. 6     FIG. 7
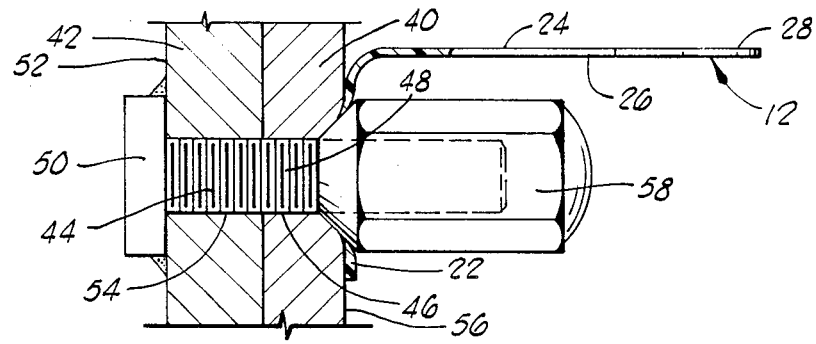
FIG. 8
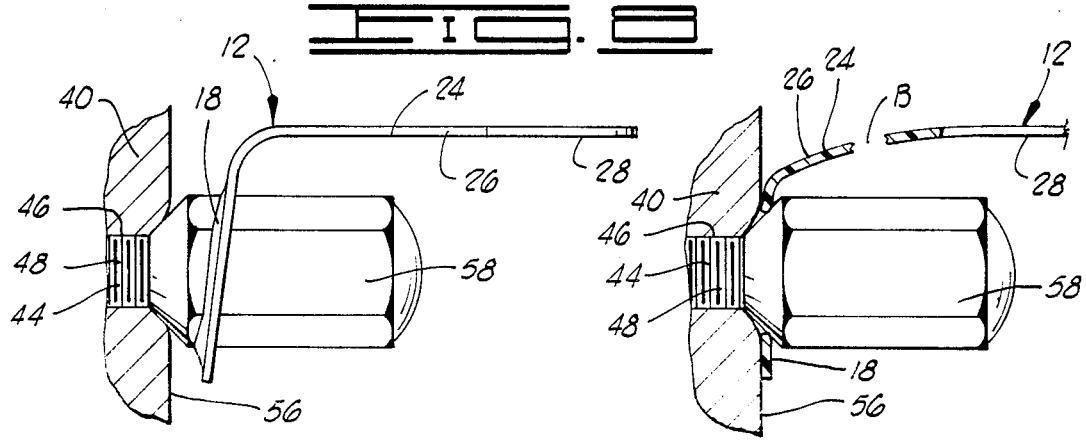
FIG. 9     FIG. 10

TORQUE VERIFICATION APPARATUS AND METHOD

BACKGROUND OF THE INVENTION

1. Field of the Invention.

The present invention relates to torque indicating apparatus and methods, and more particularly, but not by way of limitation, to apparatus and methods for verifying that an amount of torque applied to a threaded fastener is equal to or greater than a predetermined torque value.

2. Description of the Prior Art.

Wheel loss is a major cause of automobile accidents throughout the world. The loss of a wheel during operation of an automobile can cause the automobile to veer off the road or into oncoming traffic. Although the loss of a wheel can be caused by many factors, it is most commonly caused by the failure of mechanics to sufficiently tighten the wheel onto the wheel hub of the automobile. Due to the growing number of tire and brake repair and replacement specialty shops, this problem is getting worse instead of better.

When replacing or repairing tires and brakes, the typical mechanic will remove all four of the wheels from the wheel hubs of the automobile at the same time. After the new tires are mounted on the wheels or the other work is performed, the mechanic will position all of the wheels back on the wheel hubs before any lug nuts are threaded onto the lug studs. Once all of the wheels are positioned back on the wheel hubs, the mechanic will thread the lug nuts onto the lug studs and tighten the lug nuts with an impact wrench. Most mechanics rely on feel to make sure that the amount of torque applied to the lug nuts equals or exceeds a proper torque value.

Due to the number of tires that a tire and/or brake mechanic removes and replaces each day, it is easy for the mechanic to forget to tighten one or more of the lug nuts after the lug nuts are threaded onto the lug studs. Unfortunately, once the lug nuts are threaded onto the lug studs, it is hard to visually determine if they have been tightened. Even if the mechanic remembers to tighten all of the lug nuts, the lug nuts are not always tightened sufficiently. The mechanic's feeling as to the magnitude of the torque applied to the lug nuts may not accurately verify that the lug nuts have been sufficiently tightened. If the threads of the lug nut or lug stud are worn or stripped, the mechanic may think that the lug nuts have been sufficiently tightened when in fact they have not.

Due to the time and trouble involved, most tire and/or brake mechanics do not use a torque wrench or similar torque indicating apparatus to make sure that the lug nuts have been sufficiently tightened. Furthermore, as with the mechanic's own feeling, the indication provided by torque wrenches and similar torque indicating apparatus may not be accurate. If the threads of the lug stud or lug nut are worn or stripped, the torque wrench or other apparatus may indicate that the lug nuts have been sufficiently tightened when in fact they have not.

If one or more of the lug nuts are not sufficiently tightened, the wheel may rotate out of alignment. This can put excessive stress on and result in failure of one or more of the lug studs and/or the wheel hub, which can ultimately result in loss of the wheel. Thus, failure to apply a sufficient amount of torque to just one lug nut can result in the wheel eventually falling off.

There is a need for a reliable means to remind mechanics to tighten each lug nut and to verify that the lug nuts have been tightened sufficiently.

SUMMARY OF THE INVENTION

By the present invention, an apparatus and method for reminding mechanics replacing wheels on automobiles to tighten the lug nuts onto the lug studs and for verifying that the lug nuts have been tightened sufficiently are provided. Although the apparatus and method are particularly useful in the tire and brake replacement and repair industry, they can be used in conjunction with any type of threaded fastener.

The torque verification apparatus of the present invention is for use in connection with a threaded fastener of the type comprising a threaded nut and a bolt having a threaded body portion and a head portion. The apparatus is for verifying that an amount of torque applied to the nut is equal to or greater than a predetermined torque value.

The torque verification apparatus comprises a member having an opening therein for receiving the threaded body portion of the bolt and a peripheral surface surrounding the opening. The opening has a perimeter large enough to receive the threaded body portion of the bolt but smaller than the outside perimeter of the nut whereby the peripheral surface will be clamped between the head portion of the bolt and the nut when the nut is tightened onto the threaded body portion of the bolt. The peripheral surface is formed of extrudable material and has a thickness so that when an amount of torque applied to the nut equals or exceeds the predetermined torque value, the peripheral surface will be sufficiently extruded from between the head of the bolt and the nut to allow it to be pulled over the nut without breaking, but when an amount of torque applied to the nut is less than the predetermined torque value, the peripheral surface will not be sufficiently extruded from between the head of the bolt and the nut to allow it to be pulled over the nut without breaking. The apparatus also comprises a handle attached to the peripheral surface for allowing the peripheral surface to be pulled outwardly from the nut.

The torque verification method of the present invention is for use in conjunction with a method of attaching a first object to a second object with a fastener of a type comprising a threaded nut and a bolt having a threaded body portion and a head portion whereby the head portion is held to the second object, the threaded body portion is extended through an opening in the first object, the threaded nut is threaded onto the threaded body portion and an amount of torque is applied to the nut to clamp the first object between the second object and the nut. The inventive method provides verification that the amount of torque applied to the nut is equal to or greater than a predetermined torque value.

The method comprises the step of before threading the nut onto the threaded body portion of the bolt, placing a torque verification apparatus on the threaded body portion of the bolt, the torque verification apparatus comprising a member having an opening therein for receiving the threaded body portion of the bolt, a peripheral surface surrounding the opening and a handle attached to the peripheral surface. The opening has a perimeter large enough to receive the threaded body portion of the bolt but smaller than the outside perimeter of the nut. The peripheral surface is formed of extrudable material and has a thickness so that when an amount of torque applied to the nut is equal to or greater than the predetermined torque value, the peripheral surface will be sufficiently extruded from between the first object and the nut to allow it to be pulled over the nut without breaking, but when an amount of torque applied to the nut is less than the predetermined torque value, the peripheral surface will not be sufficiently extruded from between the first object and the nut to allow it to be pulled over the nut without breaking.

The method further comprises the step of after threading the nut onto the threaded body portion of the bolt whereby the peripheral surface of the torque verification apparatus is clamped between the first object and the nut and after applying an amount of torque to the nut, pulling the handle of the torque verification apparatus outwardly from the nut whereby if the peripheral surface pulls over the nut without breaking, the amount of torque applied to the nut is verified to be equal to or greater than the predetermined torque value.

The torque verification method of the present invention is particularly effective for use in conjunction with a method of mounting a wheel to a wheel hub of a vehicle whereby the wheel is placed on the hub in a position such that the lug studs attached to and extending from the hub extend through corresponding openings in the wheel, lug nuts are threaded onto the lug studs and an amount of torque is applied to the lug nuts to securely clamp the wheel between the hub and the lug nuts. The method provides verification that the amount of torque applied to at least one of the lug nuts is equal to or greater than a predetermined torque value.

It is, therefore, an object of the present invention to provide apparatus and methods for reliably verifying that an amount of torque applied to a threaded fastener is equal to or greater than a predetermined torque value.

It is a principal object of the invention to reduce wheel loss and serious accidents resulting therefrom by providing apparatus and methods for reminding mechanics to tighten lug nuts onto lug studs and for verifying that the lug nuts have been tightened sufficiently.

Further objects of the present invention are to provide apparatus and methods for helping mechanics determine when the amount of torque applied to a lug nut has reached or exceeded a predetermined torque value and to provide apparatus and methods for providing hard evidence that the lug nuts used to secure a wheel to a wheel hub of an automobile have been tightened sufficiently.

Numerous other objects, features and advantages of the present invention will be readily apparent to those skilled in the art upon a reading of the following disclosure when taken in conjunction with the accompanying drawings.

BRIEF DESCRIPTION OF THE DRAWINGS

FIG. 6 is a front view of a wheel mounted to the wheel hub of an automobile with torque verification apparatus of the present invention placed on the lug studs between the wheel and the lug nuts.

FIG. 7 is a cross-sectional view taken along line 7—7 of FIG. 6.

FIG. 8 is an enlarged partial cross-sectional view of a portion of the wheel assembly of FIG. 7 showing the torque verification apparatus of the present invention placed on a lug stud between the wheel and the lug nut before the lug nut is tightened.

FIG. 9 is an enlarged partial cross-sectional view of a portion of the wheel assembly of FIG. 7 showing the torque verification apparatus of the present invention placed on a lug stud between the wheel and the lug nut after an amount of torque greater than or equal to a predetermined torque value has been applied to the lug nut and the handle of the torque verification apparatus has been partially pulled outwardly from the lug nut.

FIG. 10 is a view similar to FIG. 9, but showing the torque verification apparatus of the present invention placed on the wheel stud between the wheel and the lug nut after an amount of torque that is not greater than or equal to a predetermined torque value has been applied to the lug nut and the handle of the torque verification apparatus has been pulled outwardly from the nut.

DETAILED DESCRIPTION OF THE PREFERRED EMBODIMENTS

Figure 1:
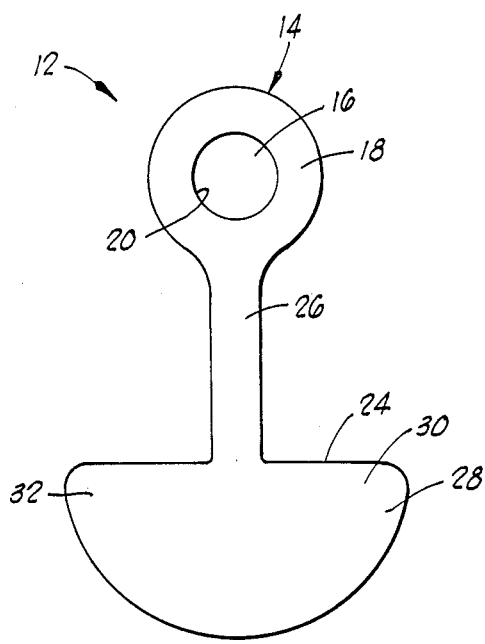
FIG. 1 is a front view of the torque verification apparatus of the present invention showing the apparatus before it is used.
Figure 2:
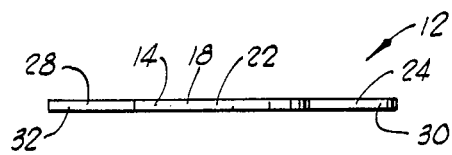
FIG. 2 is a top view of the apparatus of FIG. 1.
Figure 3:
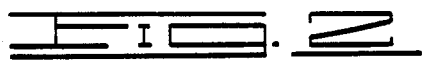
FIG. 3 is a side view of the apparatus of FIG. 1.

In accordance with the present invention, apparatus and methods for verifying that an amount of torque applied to a threaded fastener is equal to or greater than a predetermined torque value are provided. The torque verification apparatus is for use in connection with a threaded fastener of the type comprising a threaded nut and a bolt having a threaded body portion and a head portion. As used herein and in the appendant claims, the "head portion" of the bolt refers to the end of the bolt that is opposite the end of the bolt that receives the threaded nut. When the threaded fastener is used to attach a first object such as a wheel to a second object such as a wheel hub, the head portion of the bolt is "held" to the second object. As used herein and in the appendant claims, "held" to the second object means blocked by, formed with, welded to or otherwise attached or held by the second object. The torque verification apparatus is for verifying that an amount of torque applied to the nut is equal to or greater than a predetermined torque value. Referring now to the drawings and particularly to FIGS. 1–3, the torque verification apparatus of the present invention is illustrated and generally designated by the numeral 12. The apparatus comprises a member 14 having an opening 16 defined therein for receiving the threaded body portion of the bolt and a peripheral surface 18 surrounding the opening. The opening 16 has a perimeter 20 large enough to receive the threaded body portion of the bolt but smaller than the outside perimeter of the nut whereby the peripheral surface 18 will be clamped between the head portion of the bolt and the nut when the nut is tightened onto the threaded body portion of the bolt. The peripheral surface 18 is formed of extrudable material and has a thickness 22 so that when an amount of torque applied to the nut equals or exceeds the predetermined torque value, the peripheral surface will be sufficiently extruded from between the head of the bolt and the nut to allow it to be pulled over the nut without breaking, but when an amount of torque applied to the nut is less than the predetermined torque value, the peripheral surface will not be sufficiently extruded from between the head of the bolt and the nut to allow it to be pulled over the nut without breaking. A handle 24 is attached to the peripheral surface 18 for allowing the peripheral surface to be pulled outwardly from the nut.

The apparatus 12 can be formed in any size and shape. In the most preferred embodiment of the apparatus 12, the opening 16 is circular in shape, and the peripheral surface 18 is annular in shape. The diameter of the opening 16 is about ½ of an inch, while the outside diameter of the peripheral surface 18 is about one inch.

The peripheral surface 18 can be formed of any type of extrudable material. In the most preferred embodiment of the apparatus 12, the peripheral surface 18 is formed of high density polyethylene.

The thickness of the peripheral surface 18 will vary depending upon the predetermined torque value. The thickness of the peripheral surface is directly proportional to the amount of torque that must be applied to the nut to sufficiently extrude the peripheral surface 18 from between the head of the bolt and the nut to allow it to be pulled over the nut without breaking. To increase the amount of torque that must be applied to the nut to sufficiently extrude the peripheral surface 18 from between the head of the bolt and the nut to allow the peripheral surface to be pulled over the nut without breaking, the thickness of the peripheral surface is increased. Likewise, to decrease the amount of torque that must be applied to the nut to sufficiently extrude the peripheral surface 18 from between the head of the bolt and the nut to allow it to be pulled over the nut without breaking, the thickness of the peripheral surface is decreased.

Other factors such as the areas of the surfaces of the second object and the nut in contact with the peripheral surface 18, the shapes of the surfaces of the second object and the nut in contact with the peripheral surface, and the type of material forming the peripheral surface also affect the amount of torque that must be applied to the nut to sufficiently extrude the peripheral surface from between the head of the bolt and the nut to allow it to be pulled over the nut without breaking. If these other factors are constant in a particular application, the predetermined torque value, i.e., the minimum amount of torque that must be applied to the nut to sufficiently extrude the peripheral surface 18 from between the head of the bolt and nut to allow the peripheral surface to be pulled over the nut without breaking, can be adjusted up or down by merely changing the thickness of the peripheral surface.

The exact thickness of the peripheral surface 18 of the apparatus 12 that will allow the peripheral surface to be sufficiently extruded from between the head of the bolt and the nut to allow it to be pulled over the nut without breaking when a particular amount of torque is applied to the nut must be determined for each type of wheel and wheel assembly or other object and fastener assembly being used. For a very common type of wheel and wheel assembly, it is recommended by the OEM recommended specifications that 60 foot-pounds of torque should be used to tighten the lug nuts. When used with this type of wheel and wheel assembly, the peripheral surface 18 of the most preferred embodiment of the apparatus 12 of the present invention will be sufficiently extruded from between the wheel and the lug nut when 60 foot-pounds of torque is applied to the lug nut if it is about 3/16 of an inch thick.

The handle 24 comprises an elongated extension arm 26 attached to and extending outwardly from the peripheral surface and a finger tab 28 attached to the extension arm. The extension arm 26 is preferably of a length sufficient to allow the finger tab 28 to be reached and grasped easily by the user. The finger tab 28 comprises two tab portions 30 and 32 extending outwardly from the extension arm 26 in opposite directions. The finger tab 28 is about 2¼ inches wide. The length of the entire apparatus 12 is about 3½ inches.

The peripheral surface 18 and the handle 24 are integrally formed of the same material, preferably high density polyethylene. The apparatus 12 can be easily manufactured by integrally forming the apparatus as a one-piece member.

The method of the present invention is for use in conjunction with a method of attaching a first object to a second object with a fastener of a type comprising a threaded nut and a bolt having a threaded body portion and a head portion whereby the head portion is held to the second object, the threaded body portion is extended through an opening in the first object, the threaded nut is threaded onto the threaded body portion and an amount of torque is applied to the nut to clamp the first object between the second object and the nut. The method provides verification that the amount of torque applied to the nut is equal to or greater than a predetermined torque value.

In operation, before the nut is threaded onto the threaded body portion of the bolt, the torque verification apparatus 12 is placed on the threaded body portion of the bolt. Washers and other fastening apparatus can be placed onto the threaded body portion of the bolt before the apparatus 12 is placed on the threaded body portion of the bolt. After threading the nut onto the threaded body portion of the bolt whereby the peripheral surface 18 of the apparatus 12 is clamped between the first object and the nut and after applying an amount of torque to the nut, the handle 24 of the apparatus 12 is pulled outwardly from the nut whereby if the peripheral surface 18 pulls over the nut without breaking, the amount of torque applied to the nut is verified to be equal to or greater than the predetermined torque value.

Figure 4:
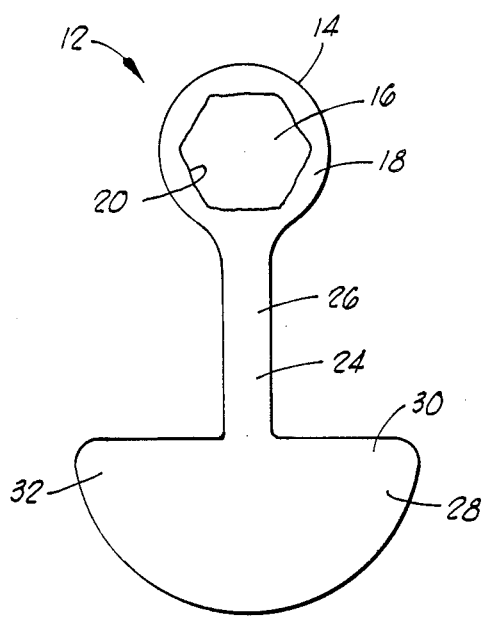
FIG. 4 is a front view of the torque verification apparatus of the present invention showing the apparatus after the apparatus is used to verify that an amount of torque applied to a nut is equal to or greater than a predetermined torque value.

FIG. 4 shows the torque verification apparatus 12 after the apparatus is used to verify that the amount of torque applied to a nut is equal to or greater than a predetermined torque value. As shown, the peripheral surface 18 was sufficiently extruded from between a first object and the nut to allow it to be pulled over the nut without breaking.

Figure 5:
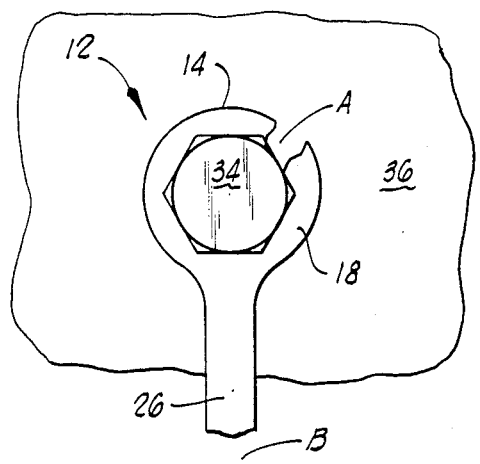
FIG. 5 is a front view of the torque verification apparatus of the present invention showing the apparatus after the apparatus is used to verify that an amount of torque applied to a nut is not equal to or greater than a predetermined torque value.

FIG. 5 shows the torque verification apparatus 12 after the apparatus is used to verify that the amount of torque applied to a nut 34 is not equal to or greater than the predetermined torque value. As shown, the peripheral surface 18 was not sufficiently extruded from between the first object 36 and the nut 34 to allow it to be pulled over the nut without breaking. As illustrated, when the amount of torque applied to the nut is not equal to or greater than the predetermined torque value, either the peripheral surface 18 will break at a point such as point A, or the handle 24 will break at a point such as point B when the handle is pulled outwardly from the nut.

Referring now to FIGS. 6-10, the operation of the torque verification apparatus 12 as used to verify that the amount of torque applied to the lug nuts used to mount a wheel to a wheel hub of an automobile is equal to or greater than a predetermined torque value will be described.

After the tire or brake is replaced or the other service work is performed, the wheel 40 is placed on the wheel hub 42 of the vehicle in a position such that the lug studs 44 extend through corresponding openings 46 in the wheel. The fastener assemblies used to mount the wheel are just like any other threaded fasteners. As best shown in FIG. 8, each of the fastener assemblies comprise a bolt or lug stud 44 having a threaded body portion 48 and a head portion 50. The head portion 50 is welded to the back surface 52 of the second object or wheel hub 42. The threaded body portion 48 extends through an opening 54 in the second object or wheel hub 42, through the opening 46 in the first object or wheel 40 and outwardly from the first surface 56 of the wheel.

Next, as shown in FIG. 6, a torque verification apparatus is placed onto each lug stud 44 over the wheel 40. Lug nuts 58 are then threaded onto the lug studs 44. If desired at this point, the lug nuts 58 can be finger tightened until they contact the peripheral surfaces 18 of the torque verification apparatus 12.

Next, the lug nuts 58 are tightened until the mechanic feels that the proper amount of torque has been applied thereto. Usually, in order to make sure that the wheel is mounted straight, it is best to tighten each lug nut a little bit at a time. To verify that the amount of torque applied to a particular lug nut 58 is equal to or greater than a predetermined torque value, i.e., the minimum torque value to which the lug nut should have been tightened, the handle 24 of the torque verification apparatus 12 positioned adjacent that nut is pulled outwardly from the nut. If the peripheral surface 18 of the apparatus 12 pulls over the lug nut 58 without breaking, the amount of torque applied to the nut is verified to be equal to or greater than the predetermined torque value. If, on the other hand, the peripheral surface 18 of the apparatus 12 does not pull over the lug nut 58 without breaking, the amount of torque applied to the lug nut is verified to be less than the predetermined torque value. If the amount of torque applied to the lug nut is verified to be less than the predetermined torque value, the tension of the lug nut should be checked and/or adjusted. If desired, the lug nut can be removed, a new torque verification apparatus 12 can be placed over the lug stud, and the process can be repeated. The same process is then repeated for each of the remaining lug nuts to verify that the amount of torque applied thereto is equal to or greater than the predetermined torque value.

FIG. 9 shows a torque verification apparatus 12 being pulled over a lug nut 58 after an amount of torque equal to or greater than the predetermined torque value has been applied to the nut. As shown, the peripheral surface 18 of the apparatus 12 has been sufficiently extruded from between the wheel 40 and the lug nut 58 to allow it to be pulled over the lug nut without breaking.

FIG. 10 shows a torque verification apparatus 12 after an amount of torque less than the predetermined torque value has been applied to the nut. As shown, the peripheral surface 18 of the apparatus 12 has not been sufficiently extruded from between the wheel 40 and the lug nut 58 to allow it to be pulled over the nut without breaking. As illustrated, the extension arm 26 of the handle 24 pulled apart at a point B when the handle was pulled outwardly from the nut.

If desired, each used torque verification apparatus 12, including any torque verification apparatus 12 used to recheck the amount of torque applied to a particular nut, can be placed into an envelope and saved as evidence that the mechanic tightened each lug nut to at least the predetermined torque value. If a customer subsequently loses a wheel, the mechanic can prove that it was not his or her fault.

Thus, many advantages are achieved by the present invention. The torque verification apparatus and methods of the invention remind mechanics to tighten the lug nuts after the lug nuts have been threaded onto the lug studs. Of equal importance, the apparatus and methods of the invention verify that the amount of torque applied to the lug nuts is greater than or equal to a predetermined torque value. By ensuring that all of the lug nuts are sufficiently tightened, the present invention reduces wheel loss and serious accidents resulting therefrom.

The torque verification apparatus of the present invention is easy to manufacture. The cost of the apparatus is significantly less than other torque verification apparatus developed heretofore. The torque verification apparatus and methods of the invention are easy to use. The cost of the apparatus and the amount of time required to use the apparatus are insignificant when compared to the advantages achieved thereby.

Although the torque verification apparatus and methods of the present invention do not indicate when the lug nuts have been tightened to an excessive torque, they cause mechanics to be more conscious to avoid overtightening the nuts.

The torque verification apparatus and methods of the invention provide evidence that all of the lug nuts used to mount a wheel to a wheel hub of an automobile were tightened to at least a predetermined torque value. This evidence can result in a decline of legal liability and the legal fees and insurance premiums associated therewith. Use of the torque verification apparatus and methods of the invention increase customer satisfaction of the mechanic's work.

Thus, the torque verification apparatus and methods of the present invention are well adapted to carry out the objects and attain the ends and advantages mentioned as well as inherent therein. While numerous changes in the arrangement and construction of parts and the steps of the method employed will suggest themselves to those skilled in the art, such changes are encompassed within the scope of this invention as defined by the appended claims.

What is claimed is:

1. Torque verification apparatus for use in connection with a fastener of the type comprising a threaded nut and a bolt having a threaded body portion and a head portion, said threaded body portion having a central axis, and for verifying that an amount of torque applied to the nut is equal to or greater than a predetermined torque value, comprising:

a member having an opening therein for receiving the threaded body portion of the bolt and a peripheral surface surrounding said opening, said opening having a perimeter large enough to receive the threaded body portion of the bolt but smaller than the outside perimeter of the nut whereby said peripheral surface will be clamped between the head portion of the bolt and the nut when the nut is tightened onto the threaded body portion of the bolt, said peripheral surface having a thickness and area, and being formed of an extrudable material of the type, so that when an amount of torque applied to the nut equals or exceeds said predetermined toque value, said peripheral surface will be sufficiently extruded completely from between the head of the bolt and the nut to allow it to be pulled over the nut in a substantially axial direction with respect to the threaded body portion of the bolt without breaking, but when an amount of torque applied to the nut is less than the predetermined torque value, said peripheral surface will not be sufficiently extruded completely from between the head of the bolt and the nut to allow it to be pulled over the nut in a substantially axial direction with respect to the threaded body portion of the bolt without breaking; and a handle attached to said peripheral surface for allowing said peripheral surface to be pulled outwardly from the nut in a substantially axial direction with respect to the threaded body portion of the bolt, said handle comprising an elongated extension arm portion attached to and extending outwardly and unidirectionally from said peripheral surface and finger grip means attached to said extension arm portion.

2. The apparatus of claim 1 wherein said peripheral surface and said handle are integrally formed of the same material.

3. The apparatus of claim 1 wherein said opening of said apparatus is circular in shape.

4. The apparatus of claim 3 wherein said peripheral surface of said apparatus is annular in shape.

5. The apparatus of claim 1 wherein said peripheral surface is formed of polyethylene.

6. The apparatus of claim 5 wherein said predetermined torque value is about 60 foot-pounds and said peripheral surface is about 3/16 of an inch thick.

7. A method of attaching a first object to a second object with a fastener of a type comprising a threaded nut and a bolt having a threaded body portion and a head portion, said threaded body portion having a central axis, whereby the head portion is held to the second object, and for verifying that an amount of torque applied to the nut is equal to or greater than a predetermined torque value which comprises:

extending the threaded body portion of the bolt through an opening in the first object;

placing a torque verification apparatus on the threaded body portion of the bolt, said torque verification apparatus comprising a member having an opening therein for receiving the threaded body portion of the bolt, a peripheral surface surrounding said opening and a handle attached to said peripheral surface and extending outwardly therefrom, said opening having a perimeter large enough to receive the threaded body portion of the bolt but smaller than the outside perimeter of the nut, said peripheral surface having a thickness and area, and being formed of an extrudable material of the type, so that when an amount of torque applied to the nut is equal to or greater than said predetermined torque value, said peripheral surface will be sufficiently extruded completely from between the first object and the nut to allow it to be pulled over the nut in a substantially axial direction with respect to the threaded body portion of the bolt without breaking, but when an amount of torque applied to the nut is less than said predetermined torque value, said peripheral surface will not be sufficiently extruded completely from between the first object and the nut to allow it to be pulled over the nut in a substantially axial direction with respect to the threaded body portion of the bolt without breaking;

threading the threaded nut onto the threaded body portion of the bolt whereby said peripheral surface of said torque verification apparatus is clamped between the first object and the nut;

applying an amount of torque to the nut; and pulling said handle of said torque verification apparatus outwardly from the nut in a substantially axial direction with respect to the threaded body portion of the bolt until either said peripheral surface pulls over the nut without breaking or said peripheral surface or said handle breaks whereby if said peripheral surface pulls over the nut in a substantially axial direction with respect to the threaded body portion of the bolt without breaking, the amount of torque applied to the nut is verified to be equal to or greater than said predetermined torque value.

8. The method of claim 7 wherein said peripheral surface and said handle of said torque verification apparatus are integrally formed of the same material.

9. The method of claim 7 wherein said handle of said torque verification apparatus comprises an elongated extension arm portion attached to and extending outwardly and unidirectionally from said peripheral surface of said torque verification apparatus and a finger tab attached to said extension arm portion.

10. The method of claim 7 wherein said opening of said torque verification apparatus is circular in shape.

11. The method of claim 10 wherein said peripheral surface of said torque verification apparatus is annular in shape.

12. The method of claim 7 wherein said peripheral surface of said torque verification apparatus is formed of polyethylene.

13. The method of claim 12 wherein said predetermined torque value is about 60 foot-pounds and said peripheral surface of said torque verification apparatus is about 3/16 of an inch thick.

14. A method of mounting a wheel to a wheel hub of a vehicle whereby the wheel hub is of a type having a plurality of threaded lug studs attached to and extending therefrom with each of the threaded lug studs having a central axis, the wheel is of a type having a plurality of openings corresponding to the threaded lug studs and a plurality of threaded lug nuts are threaded onto the lug studs to clamp the wheel between the wheel hub and the lug nuts, and for verifying that an amount of torque applied to at least one of the lug nuts is equal to or greater than a predetermined torque value which comprises:

placing the wheel on the wheel hub in a position such that the lug studs of the wheel hub extend through the corresponding openings in the wheel;

placing a torque verification apparatus on at least a first lug stud, said torque verification apparatus comprising a member having an opening therein for receiving the lug stud, a peripheral surface surrounding the opening and a handle attached to the peripheral surface and extending outwardly therefrom, the opening having a perimeter large enough to receive the first lug stud but smaller than the outside perimeter of a corresponding first lug nut, the peripheral surface having a thickness and area, and being formed of an extrudable material of the type, so that when an amount of torque applied to the first lug nut is equal to or greater than said predetermined torque value, said peripheral surface will be sufficiently extruded completely from between the wheel and the first lug nut to allow it to be pulled over the first lug nut in a substantially axial direction with respect to the first lug stud without breaking, but when the amount of torque applied to the first lug nut is less than said predetermined torque value, said peripheral surface will not be sufficiently extruded completely from between the wheel and the first lug nut to allow it to be pulled over the first lug nut in a substantially axial direction with respect to the first lug stud without breaking;

threading the first lug nut onto the first lug stud whereby said peripheral surface of said torque verification apparatus is clamped between the wheel and the first lug nut;

applying an amount of torque to the first lug nut; and pulling said handle of said torque verification apparatus outwardly from the first lug nut in a substantially axial direction with respect to the first lug stud until either said peripheral surface pulls over the first lug nut without breaking or said peripheral surface or said handle breaks whereby if said peripheral surface pulls over the first lug nut in a substantially axial direction with respect to the first lug stud without breaking, the amount of torque applied to the first lug nut is verified to be equal to or greater than said predetermined torque value.

15. The method of claim 14 wherein said peripheral surface and said handle of said torque verification apparatus are integrally formed of the same material.

16. The method of claim 14 wherein said opening of said torque verification apparatus is circular in shape.

17. The method of claim 16 wherein said peripheral surface of said torque verification apparatus is annular in shape.

18. The method of claim 14 wherein said peripheral surface of said torque verification apparatus is formed of polyethylene.

19. The method of claim 18 wherein said predetermined torque value is about 60 foot-pounds and said peripheral surface of said torque verification apparatus is about 3/16 of an inch thick.

* * * * *